US012587437B2

(12) United States Patent
Mustafa

(10) Patent No.: US 12,587,437 B2
(45) Date of Patent: Mar. 24, 2026

(54) ENHANCED FAULT ISOLATION IN CONNECTIVITY FAULT MANAGEMENT (CFM)

(71) Applicant: Ciena Corporation, Hanover, MD (US)

(72) Inventor: Ghulam Mustafa, Uttar Pradesh (IN)

(73) Assignee: Ciena Corporation, Hanover, MD (US)

( * ) Notice: Subject to any disclaimer, the term of this patent is extended or adjusted under 35 U.S.C. 154(b) by 304 days.

(21) Appl. No.: 18/470,074

(22) Filed: Sep. 19, 2023

(65) Prior Publication Data

US 2025/0047553 A1 Feb. 6, 2025

(30) Foreign Application Priority Data

Aug. 4, 2023 (IN) .............................. 202311052424

(51) Int. Cl.
*H04L 41/0677* (2022.01)
*H04L 43/0811* (2022.01)

(52) U.S. Cl.
CPC ...... *H04L 41/0677* (2013.01); *H04L 43/0811* (2013.01)

(58) Field of Classification Search
CPC ... H04L 41/0677; H04L 43/0811; H04L 43/10
See application file for complete search history.

(56) References Cited

U.S. PATENT DOCUMENTS 7,995,483 B1 * 8/2011 Bayar ................. H04L 41/0895
370/245
7,995,488 B2 * 8/2011 Ding ..................... H04L 41/082
370/241.1
(Continued)

FOREIGN PATENT DOCUMENTS

AU 2009237405 A1 * 10/2009 ......... H04L 41/0663
AU 2009237405 B2 * 9/2013 ......... H04L 41/0663
(Continued)

OTHER PUBLICATIONS

Sajassi et al., Layer 2 Virtual Private Network (L2VPN) Operations, Administration, and Maintenance (OAM) Requirements and Framework, Mar. 2011, Internet Engineering Task Force (IETF), Request for Comments: 6136, ISSN: 2070-1721 (Year: 2011).*
(Continued)

*Primary Examiner* — Eric Nowlin
(74) *Attorney, Agent, or Firm* — Baratta Law PLLC; Lawrence A. Baratta, Jr.

(57) ABSTRACT

Systems and methods for enhanced fault isolation in connectivity fault management (CFM) enhance the functionality of maintenance domain intermediate point (MIP). The MIP is configured to monitor continuity check messages (CCMs) from a first maintenance association end point (MEP) and a second MEP, and, responsive to detection of a loss of CCMs, from the first MEP, send one or more unsolicited response messages to the second MEP. The one or more unsolicited response messages are usable by the second MEP to isolate a location of a fault causing the loss of CCMs. The one or more unsolicited response messages can be one of a loopback response message, a linktrace response message, and a combination thereof.

19 Claims, 6 Drawing Sheets

(56) References Cited

U.S. PATENT DOCUMENTS

| | | | | |
|---|---|---|---|---|
| 8,102,774 | B2 * | 1/2012 | Gero | H04L 45/70 370/236.2 |
| 8,169,896 | B2 * | 5/2012 | Saltsidis | H04L 41/0663 370/228 |
| 8,259,590 | B2 * | 9/2012 | Shah | H04L 12/437 370/242 |
| 8,406,143 | B2 * | 3/2013 | Long | H04L 41/06 370/248 |
| 8,432,833 | B2 * | 4/2013 | Rustagi | H04L 43/10 709/224 |
| 8,441,937 | B2 * | 5/2013 | Gero | H04L 43/0811 370/236.2 |
| 8,570,877 | B1 * | 10/2013 | Bayar | H04L 41/0681 370/242 |
| 8,593,945 | B2 * | 11/2013 | Saltsidis | H04L 41/0663 370/228 |
| 8,929,203 | B2 * | 1/2015 | Ding | H04L 12/462 370/227 |
| 9,184,986 | B2 * | 11/2015 | Mehta | H04L 43/10 |
| 9,264,328 | B2 * | 2/2016 | Hu | H04L 41/0886 |
| 9,282,015 | B2 * | 3/2016 | Sawaguchi | H04L 43/0811 |
| 9,313,093 | B2 * | 4/2016 | Jadav | H04L 41/0672 |
| 9,780,964 | B1 * | 10/2017 | Salam | H04L 43/0882 |
| 10,142,203 | B2 * | 11/2018 | Jadav | H04L 41/0661 |
| 10,193,746 | B2 * | 1/2019 | A | H04L 43/0811 |
| 10,333,770 | B2 * | 6/2019 | Batra | H04L 43/0811 |
| 10,476,763 | B2 * | 11/2019 | Holness | H04L 43/0829 |
| 10,623,293 | B2 * | 4/2020 | Hu | H04L 41/0816 |
| 10,735,251 | B2 * | 8/2020 | A | H04L 43/0811 |
| 10,996,971 | B2 * | 5/2021 | Toy | H04L 43/0852 |
| 11,128,518 | B2 * | 9/2021 | Curtis | H04L 41/5054 |
| 11,206,197 | B2 * | 12/2021 | Holness | H04L 47/125 |
| 11,483,195 | B2 * | 10/2022 | Baheri | H04L 41/0213 |
| 11,632,287 | B1 | 4/2023 | Mustafa et al. | |
| 11,743,100 | B2 * | 8/2023 | Curtis | H04L 41/5054 709/223 |
| 2007/0140126 | A1 * | 6/2007 | Osswald | H04L 43/0811 370/242 |
| 2008/0112331 | A1 * | 5/2008 | Long | H04L 41/06 370/245 |
| 2009/0161562 | A1 * | 6/2009 | Shah | H04L 43/0811 370/245 |
| 2010/0146324 | A1 * | 6/2010 | Sajassi | H04L 41/0659 714/2 |
| 2010/0290345 | A1 * | 11/2010 | Gero | H04L 45/70 370/241.1 |
| 2011/0026397 | A1 * | 2/2011 | Saltsidis | H04L 41/0663 370/228 |
| 2011/0128861 | A1 * | 6/2011 | Ding | H04L 43/0811 370/248 |
| 2012/0014263 | A1 * | 1/2012 | Unger | H04L 43/0811 370/248 |
| 2012/0120809 | A1 * | 5/2012 | Gero | H04L 43/0811 370/241.1 |
| 2012/0189020 | A1 * | 7/2012 | Rustagi | H04L 41/0806 370/419 |
| 2012/0195191 | A1 * | 8/2012 | Saltsidis | H04L 41/0663 370/242 |
| 2012/0300637 | A1 * | 11/2012 | Sabetto | H04L 47/12 370/236 |
| 2013/0114394 | A1 * | 5/2013 | Hu | H04L 41/0816 370/216 |
| 2013/0229924 | A1 * | 9/2013 | Salam | H04L 43/0811 370/244 |
| 2014/0016453 | A1 * | 1/2014 | Mehta | H04L 43/10 370/242 |
| 2014/0133289 | A1 * | 5/2014 | Jadav | H04L 41/0661 370/216 |
| 2014/0293771 | A1 * | 10/2014 | Sawaguchi | H04L 43/0811 370/219 |
| 2014/0369177 | A1 * | 12/2014 | Keesara | H04L 43/0811 370/216 |
| 2015/0092588 | A1 * | 4/2015 | Ding | H04L 45/22 370/252 |
| 2016/0156540 | A1 * | 6/2016 | Hu | H04L 43/16 370/241.1 |
| 2016/0173350 | A1 * | 6/2016 | Jadav | H04L 41/0672 370/241.1 |
| 2018/0176075 | A1 * | 6/2018 | A | H04L 41/0677 |
| 2018/0295031 | A1 * | 10/2018 | Holness | H04L 47/125 |
| 2018/0309615 | A1 * | 10/2018 | Batra | H04L 43/062 |
| 2019/0158350 | A1 * | 5/2019 | A | H04L 41/0659 |
| 2020/0019425 | A1 * | 1/2020 | Toy | H04L 43/20 |
| 2020/0028761 | A1 * | 1/2020 | Holness | H04L 47/125 |
| 2020/0036570 | A1 * | 1/2020 | Curtis | H04L 41/5054 |
| 2020/0099568 | A1 * | 3/2020 | Baheri | H04L 41/0213 |
| 2020/0274735 | A1 * | 8/2020 | Sekhri | H04L 41/0604 |
| 2021/0385120 | A1 * | 12/2021 | Curtis | H04L 41/5054 |
| 2022/0103420 | A1 * | 3/2022 | Sasaki | H04L 41/16 |
| 2023/0146644 | A1 | 5/2023 | Mustafa | |
| 2023/0155880 | A1 * | 5/2023 | Mustafa | H04L 41/0686 370/342 |
| 2023/0208756 | A1 * | 6/2023 | Yu | H04L 43/10 370/392 |

FOREIGN PATENT DOCUMENTS

| | | | | | |
|---|---|---|---|---|---|
| BR | PI0910949 | B1 * | 9/2020 | | H04L 41/0663 |
| CA | 2722247 | A1 * | 10/2009 | | H04L 41/0663 |
| CA | 2722247 | C * | 12/2016 | | H04L 41/0663 |
| CN | 104079504 | A * | 10/2014 | | H04L 43/0811 |
| CN | 104079504 | B * | 3/2018 | | H04L 43/0811 |
| CN | 114221867 | A * | 3/2022 | | H04L 45/50 |
| EP | 1921804 | A1 * | 5/2008 | | H04L 12/4641 |
| EP | 2110987 | A1 * | 10/2009 | | H04L 41/0663 |
| EP | 2110987 | B1 * | 6/2011 | | H04L 41/0663 |
| EP | 2372952 | A1 * | 10/2011 | | H04L 41/0663 |
| EP | 2372952 | B1 * | 1/2013 | | H04L 41/0663 |
| EP | 2238721 | B1 * | 4/2013 | | H04L 43/0811 |
| EP | 2590365 | A1 * | 5/2013 | | H04L 41/0886 |
| EP | 2507944 | B1 * | 3/2014 | | H04L 43/0817 |
| EP | 2590365 | B1 * | 9/2017 | | H04L 43/16 |
| EP | 2595350 | B1 * | 10/2018 | | H04L 45/50 |
| EP | 3926862 | A1 * | 12/2021 | | H04L 1/243 |
| EP | 4199447 | A1 * | 6/2023 | | H04L 5/0053 |
| EP | 3926862 | B1 * | 8/2023 | | H04L 43/10 |
| EP | 4236147 | A1 * | 8/2023 | | H04L 43/10 |
| EP | 4236147 | B1 * | 5/2024 | | H04L 43/10 |
| EP | 4199447 | B1 * | 5/2025 | | H04L 45/74 |
| ES | 2365300 | T3 * | 9/2011 | | H04L 41/0663 |
| ES | 2402806 | T3 * | 5/2013 | | H04L 41/0663 |
| ES | 2463101 | T3 * | 5/2014 | | H04L 43/062 |
| JP | 2014195147 | A * | 10/2014 | | H04L 43/0811 |
| JP | 6007849 | B2 * | 10/2016 | | H04L 43/0811 |
| JP | 2023539689 | A * | 9/2023 | | H04L 41/0823 |
| NZ | 599908 | A * | 1/2014 | | H04L 43/0817 |
| WO | WO-2009127931 | A1 * | 10/2009 | | H04L 41/0663 |
| WO | WO-2011065908 | A1 * | 6/2011 | | H04L 45/66 |
| WO | WO-2022048466 | A1 * | 3/2022 | | H04L 5/0053 |

OTHER PUBLICATIONS

Busi et al., Operations, Administration, and Maintenance Framework for MPLS-Based Transport Networks, Sep. 2011, Internet Engineering Task Force (IETF), Request for Comments: 6371, ISSN: 2070-1721 (Year: 2011).*

Salam et al., Transparent Interconnection of Lots of Links (TRILL) Operations, Administration, and Maintenance (OAM) Framework, May 2014, Internet Engineering Task Force (IETF), Request for Comments: 6136, ISSN: 2070-1721 (Year: 2014).*

Senevirathne et al., Transparent Interconnection of Lots of Links (TRILL): Fault Management, Mar. 2015, Internet Engineering Task Force (IETF), Request for Comments: 6136, ISSN: 2070-1721 (Year: 2015).*

* cited by examiner

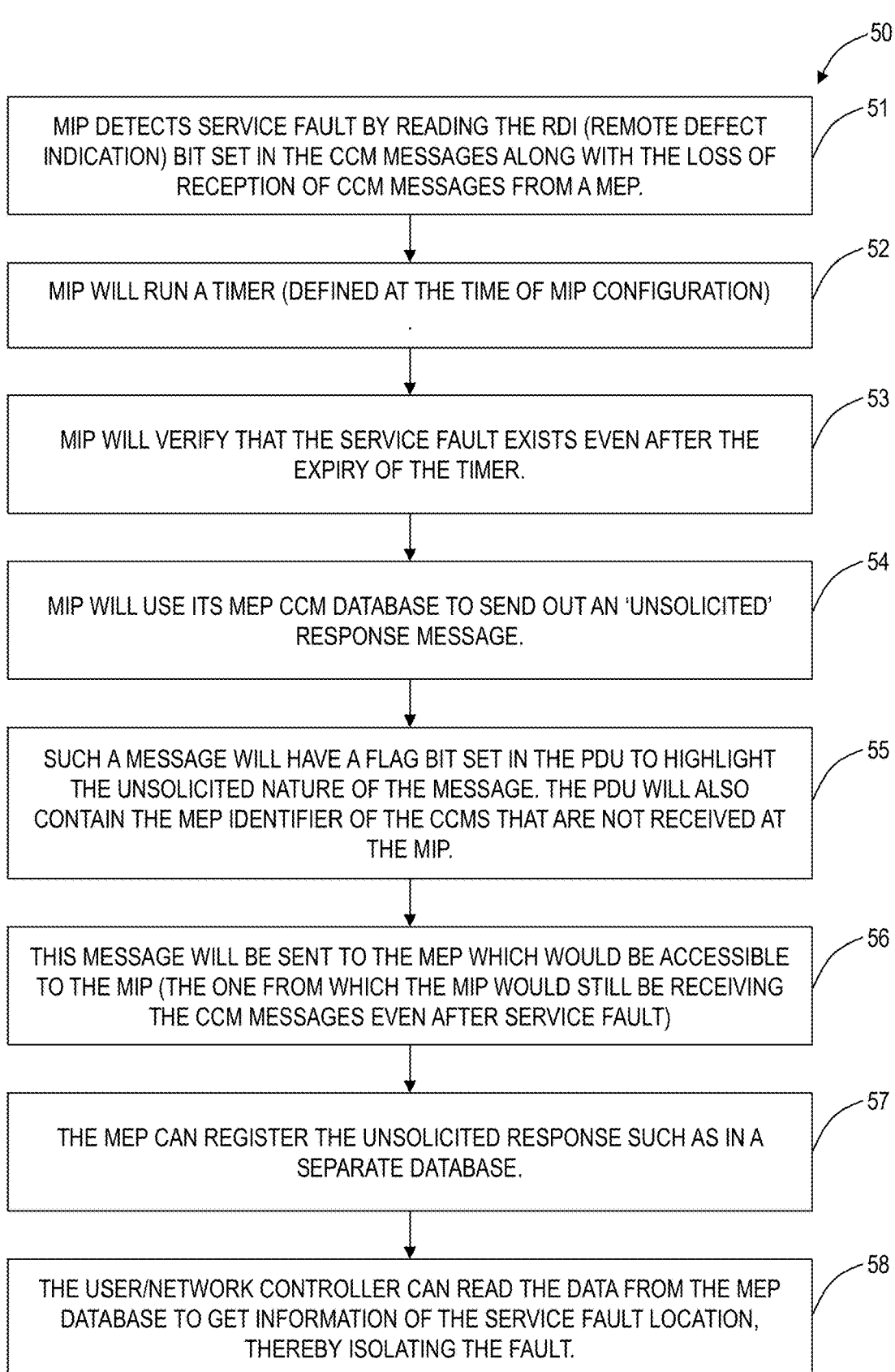

50

MIP DETECTS SERVICE FAULT BY READING THE RDI (REMOTE DEFECT INDICATION) BIT SET IN THE CCM MESSAGES ALONG WITH THE LOSS OF RECEPTION OF CCM MESSAGES FROM A MEP.

51

MIP WILL RUN A TIMER (DEFINED AT THE TIME OF MIP CONFIGURATION)

52

MIP WILL VERIFY THAT THE SERVICE FAULT EXISTS EVEN AFTER THE EXPIRY OF THE TIMER.

53

MIP WILL USE ITS MEP CCM DATABASE TO SEND OUT AN 'UNSOLICITED' RESPONSE MESSAGE.

54

SUCH A MESSAGE WILL HAVE A FLAG BIT SET IN THE PDU TO HIGHLIGHT THE UNSOLICITED NATURE OF THE MESSAGE. THE PDU WILL ALSO CONTAIN THE MEP IDENTIFIER OF THE CCMS THAT ARE NOT RECEIVED AT THE MIP.

55

THIS MESSAGE WILL BE SENT TO THE MEP WHICH WOULD BE ACCESSIBLE TO THE MIP (THE ONE FROM WHICH THE MIP WOULD STILL BE RECEIVING THE CCM MESSAGES EVEN AFTER SERVICE FAULT)

56

THE MEP CAN REGISTER THE UNSOLICITED RESPONSE SUCH AS IN A SEPARATE DATABASE.

57

THE USER/NETWORK CONTROLLER CAN READ THE DATA FROM THE MEP DATABASE TO GET INFORMATION OF THE SERVICE FAULT LOCATION, THEREBY ISOLATING THE FAULT.

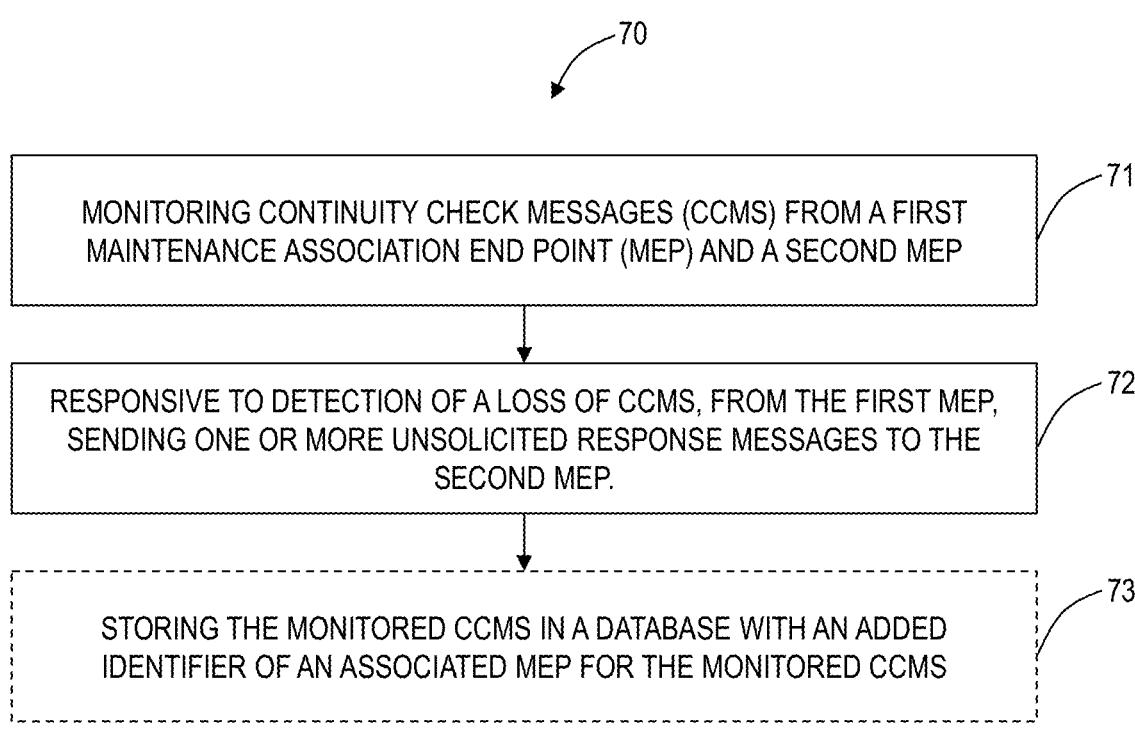
70
71
MONITORING CONTINUITY CHECK MESSAGES (CCMS) FROM A FIRST MAINTENANCE ASSOCIATION END POINT (MEP) AND A SECOND MEP
72
RESPONSIVE TO DETECTION OF A LOSS OF CCMS, FROM THE FIRST MEP, SENDING ONE OR MORE UNSOLICITED RESPONSE MESSAGES TO THE SECOND MEP.
73
STORING THE MONITORED CCMS IN A DATABASE WITH AN ADDED IDENTIFIER OF AN ASSOCIATED MEP FOR THE MONITORED CCMS
_FIG. 3_

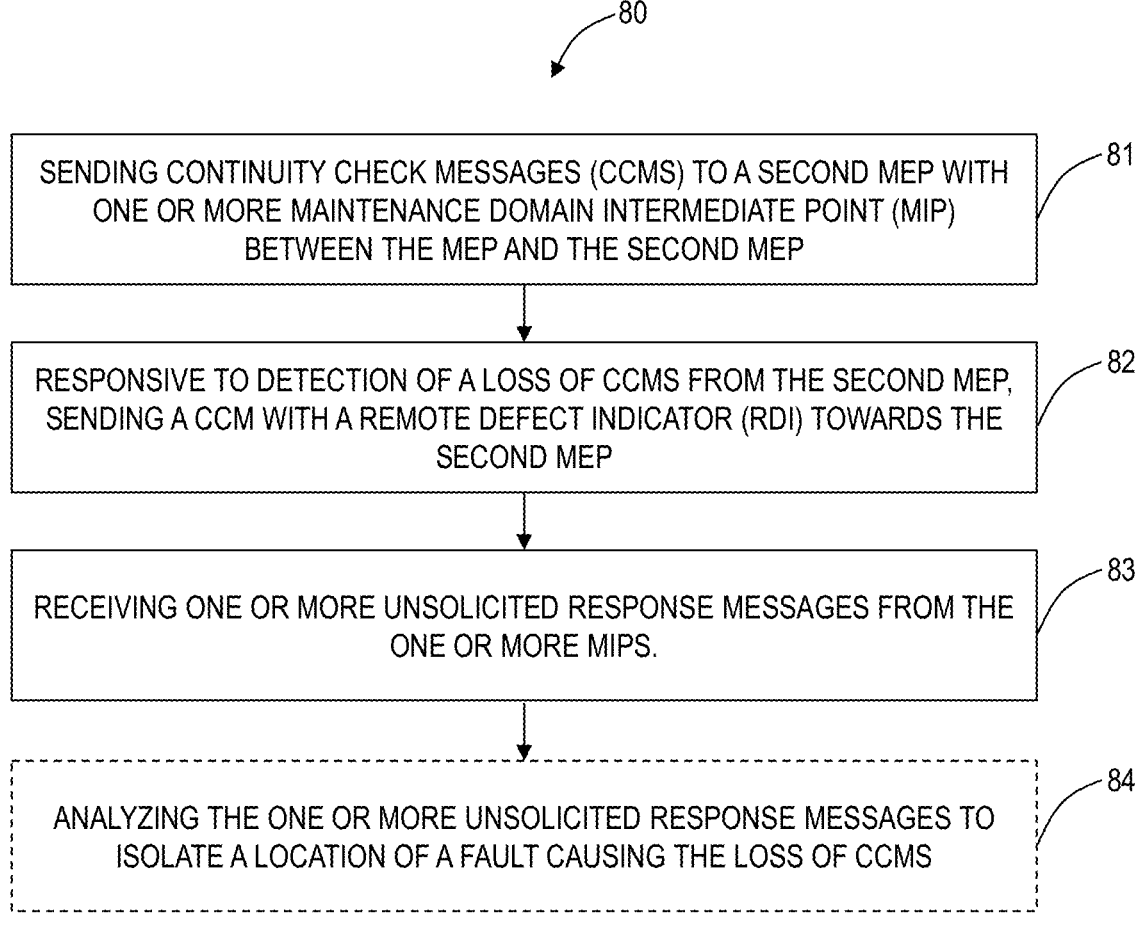

SENDING CONTINUITY CHECK MESSAGES (CCMS) TO A SECOND MEP WITH ONE OR MORE MAINTENANCE DOMAIN INTERMEDIATE POINT (MIP) BETWEEN THE MEP AND THE SECOND MEP

RESPONSIVE TO DETECTION OF A LOSS OF CCMS FROM THE SECOND MEP, SENDING A CCM WITH A REMOTE DEFECT INDICATOR (RDI) TOWARDS THE SECOND MEP

RECEIVING ONE OR MORE UNSOLICITED RESPONSE MESSAGES FROM THE ONE OR MORE MIPS.

ANALYZING THE ONE OR MORE UNSOLICITED RESPONSE MESSAGES TO ISOLATE A LOCATION OF A FAULT CAUSING THE LOSS OF CCMS

*FIG. 4*

90

| RESPONSIVE TO OPERATION OF A CONNECTIVITY FAULT MANAGEMENT (CFM) SESSION BETWEEN A FIRST MAINTENANCE ASSOCIATION END POINT (MEP) AND A SECOND MEP WITH ONE OR MORE MAINTENANCE DOMAIN INTERMEDIATE POINTS (MIPS) BETWEEN THE FIRST MEP AND THE SECOND MEP, AND RESPONSIVE TO A FAULT, RECEIVING FIRST INFORMATION FROM THE FIRST MEP AND SECOND INFORMATION FROM THE SECOND MEP BASED ON ONE OR MORE UNSOLICITED RESPONSE MESSAGES FROM THE ONE OR MORE MIPS | 91 |

| ANALYZING THE INFORMATION TO AUTOMATICALLY DETERMINE A LOCATION OF THE FAULT. | 92 |

| RESPONSIVE TO THE LOCATION BEING AUTOMATICALLY DETERMINED, ONE OR MORE OF PROVIDING A NOTIFICATION OF THE LOCATION AND PRESENTING A VISUALIZATION OF THE LOCATION | 93 |

*FIG. 5*

ENHANCED FAULT ISOLATION IN CONNECTIVITY FAULT MANAGEMENT (CFM)

FIELD OF THE DISCLOSURE

The present disclosure relates generally to networking and computing. More particularly, the present disclosure relates to systems and methods for enhanced fault isolation in connectivity fault management (CFM).

BACKGROUND OF THE DISCLOSURE

CFM is described in IEEE 802.1ag (2007), IEEE 802.1Q (2018), and ITU-T G.8013/Y.1731 (06/23), the contents of each are incorporated by reference in their entirety. CFM is used to manage connectivity at the Ethernet service layer. The IEEE 802.1ag (and IEEE 802.1Q) standard adds fault management capabilities to Ethernet, while the ITU G.8013/Y.1731 standard expands these capabilities to include performance, e.g., loss, delay, etc. A valuable feature of CFM is the ability to detect faults as well as isolate faults to a particular link or node. The conventional approach to fault isolation in CFM is a manual process, where a user needs to send various messages to determine where the fault occurred. As such, this is a time-consuming process.

BRIEF SUMMARY OF THE DISCLOSURE

The present disclosure relates to systems and methods for enhanced fault isolation in connectivity fault management (CFM). In particular, the present disclosure includes enhanced maintenance domain intermediate point (MIP) functionality to respond proactively where there is a loss of continuity, thereby automating the fault isolation process. Specifically, MIPs are conventional passive entities in a CFM network, namely they respond only to on-demand loopback and linktrace messages explicitly triggered by a user. Further, MIPs maintain a database on maintenance association endpoints (MEPs) by snooping continuity check messages (CCMs) which are heartbeat messages exchanged by MEPs. When there is a CFM failure leading to loss of CCMs, conventionally a user must manually trigger specific messages to perform fault isolation. The present disclosure modifies the MIPs to automate and enhance the fault isolation process, avoiding manual effort.

In an embodiment, a maintenance domain intermediate point (MIP) in a network supporting connectivity fault management (CFM) includes circuitry configured to monitor continuity check messages (CCMs) from a first maintenance association end point (MEP) and a second MEP, and, responsive to detection of a loss of CCMs, from the first MEP, send one or more unsolicited response messages to the second MEP. The one or more unsolicited response messages can be usable by the second MEP to isolate a location of a fault causing the loss of CCMs. The one or more unsolicited response messages can be one of a loopback response message, a linktrace response message, and a combination thereof. The one or more unsolicited response messages can include a designation it is unsolicited. The one or more unsolicited response messages can include an identifier of the first MEP from which there is the loss of CCMs. The sending one or more unsolicited response messages to the second MEP can be further responsive to reception of a CCM from the second MEP with a remote defect indication, and expiration of some predetermined time with the reception and the loss continuing. The circuitry can be further configured to store the monitored CCMs in a database with an added identifier of an associated MEP for the monitored CCMs.

In another embodiment, a maintenance association end point (MEP) in a network supporting connectivity fault management (CFM) includes circuitry configured to send continuity check messages (CCMs) to a second MEP with one or more maintenance domain intermediate point (MIP) between the MEP and the second MEP, responsive to detection of a loss of CCMs from the second MEP, send a CCM with a remote defect indicator (RDI) towards the second MEP, and receive one or more unsolicited response messages from the one or more MIPs. The circuitry can be further configured to analyze the one or more unsolicited response messages to isolate a location of a fault causing the loss of CCMs. The location can be at least after a last MIP of the one or more MIPs that provides the one or more unsolicited response messages. The one or more unsolicited response messages can be one of a loopback response message, a linktrace response message, and a combination thereof. The one or more unsolicited response messages can include a designation it is unsolicited. The one or more unsolicited response messages can include an identifier of the second MEP from which there is the loss of CCMs. The circuitry can be further configured to add the one or more unsolicited response messages in a database.

In a further embodiment, a method includes steps, an apparatus includes one or more processors configured to implement the steps, and a non-transitory computer-readable medium include instructions that, when executed, cause one or more processors to perform the steps. The steps include, responsive to operation of a connectivity fault management (CFM) session between a first maintenance association end point (MEP) and a second MEP with one or more maintenance domain intermediate points (MIPs) between the first MEP and the second MEP, and responsive to a fault, receiving first information from the first MEP and second information from the second MEP based on one or more unsolicited response messages from the one or more MIPs; and analyzing the first information and the second information to automatically determine a location of the fault. The one or more unsolicited response messages can be one of a loopback response message, a linktrace response message, and a combination thereof, sent by the one or more MIPs in response to detection of the fault. The one or more MIPs can detect the fault based on reception of a CCM with a remote defect indication, loss of the CCMs, and expiration of some predetermined time with the reception and the loss continuing. The first information and the second information can include a last MIP of the one or more MIPs that responded to each of the first MEP and the second MEP. The fault is located between the last MIP that responded to the first MEP and the last MIP that responded to the second MIP. The steps can further include, responsive to the location being automatically determined, one or more of providing a notification of the location and presenting a visualization of the location.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a flowchart of a proactive MIP process.

FIG. 3 is a flowchart of a MIP process.

FIG. 4 is a flowchart of a MEP process.

FIG. 5 is a flowchart of a management system process.

DETAILED DESCRIPTION OF THE DISCLOSURE

Again, the present disclosure relates to systems and methods for enhanced fault isolation in connectivity fault management (CFM). In particular, the present disclosure includes enhanced maintenance domain intermediate point (MIP) functionality to respond proactively where there is a loss of continuity, thereby automating the fault isolation process. Specifically, MIPs are conventional passive entities in a CFM network, namely they respond only to on-demand loopback and linktrace messages explicitly triggered by a user. Further, MIPs maintain a database on maintenance association endpoints (MEPs) by snooping continuity check messages (CCMs) which are heartbeat messages exchanged by MEPs. When there is a CFM failure leading to loss of CCMs, conventionally a user must manually trigger specific messages to perform fault isolation. The present disclosure modifies the MIPs to automate and enhance the fault isolation process, avoiding manual effort.

CFM Overview

Figure 1:
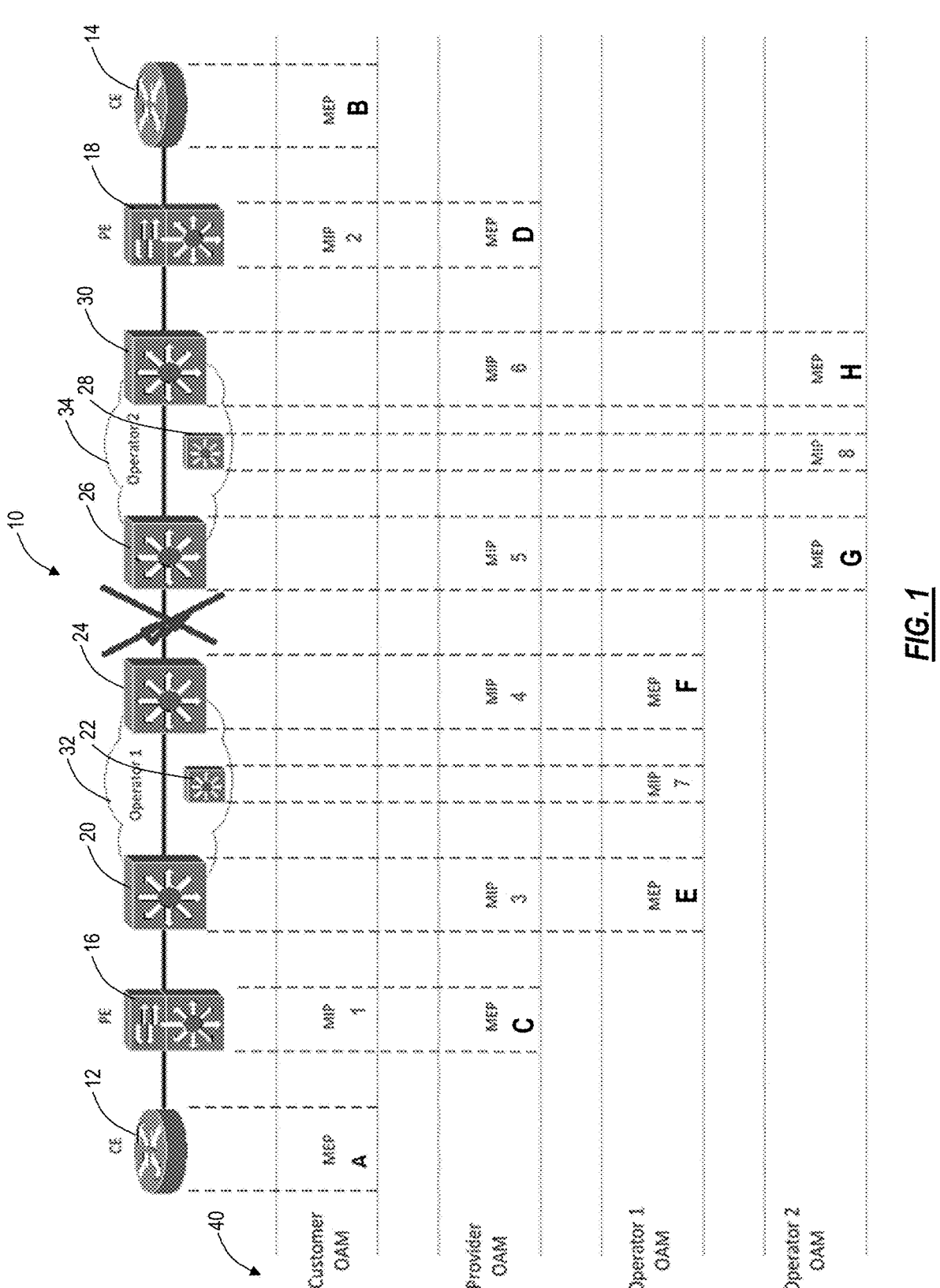
FIG. 1 is a network diagram of a network for illustrating CFM.

FIG. 1 is a network diagram of a network 10 for illustrating CFM. In particular, the network 10 illustrates interconnection of two customer edge (CE) routers 12, 14, via two provider edge (PE) routers 16, 18, and via various intermediate routers 20, 22, 24, 26, 28, 30, including different operator networks 32, 34. Of course, the network 10 is shown for illustration purposes as one example network, and those skilled in the art will recognize there can be various other implementations, all of which are contemplated herewith. The various concepts of CFM are described with reference to the network 10.

IEEE 802.1 ag is an amendment to the IEEE 802.10 networking to introduce CFM. CFM defines protocols and practices for the operations, administration, and maintenance (OAM) of paths through 802.1 bridges and local area networks (LANs). Again, IEEE 802.1ag is a subset of the earlier ITU-T Recommendation Y.1731, which additionally addresses performance monitoring.

The CFM standard:

(1) Defines maintenance domains, their constituent maintenance points, and the managed objects required to create and administrate them, (2) Defines the relationship between maintenance domains and the services offered by virtual local area network (VLAN)-aware bridges and provider bridges, (3) Describes the protocols and procedures used by maintenance points to maintain and diagnose connectivity faults within a maintenance domain, and (4) Provides means for future expansion of the capabilities of maintenance points and their protocols.

Maintenance domains (MDs) 40 are management space on the network 10, typically owned and operated by a single entity. MDs 40 can be configured with names and levels, where the eight levels range from 0 to 7. A hierarchical relationship exists between domains based on levels. The larger the domain, the higher the level value. For example, recommended values of levels are as follows:

Customer Domain: Largest (e.g., 7)

Provider Domain: In between (e.g., 3)

Operator Domain: Smallest (e.g., 1)

In the example of FIG. 1, there are four MDs 40, referred to as a customer OAM MD 40 (e.g., the largest, 7), a provider OAM MD 40 (in between), and two operator OAM MDs 40, for the operator networks 32, 34.

A MEP (which stands for maintenance endpoint or maintenance association endpoint) is a point at the edge of a domain, defining the boundary for the domain. A MEP sends and receives CFM frames through a relay function, drops all CFM frames of its level or lower that come from the wire side, etc. In the example of FIG. 1., there are MEPs A, B for the customer OAM MD 40 which are the CE routers 12, 14, MEPs C, D for the provider OAM MD 40 which are the PE routers 16, 18, MEPs E, F for the operator 1 OAM MD 40 which are the routers 20, 24, and MEPs G, H for the operator 2 OAM MD 40 which are the routers 26, 30.

A maintenance association (MA) defines a set of MEPs, all of which are configured with the same MAID (maintenance association identifier) and MD Level, each of which is configured with a MEPID unique within that MAID and MD Level, and all of which are configured with the complete list of MEPIDs.

A MIP (which stands for maintenance intermediate point or maintenance domain intermediate point) is a point internal to a domain, not at the boundary. CFM frames received from MEPs and other MIPs are cataloged and forwarded. A MIP bypasses cfm frames of higher as well as lower MD levels without processing them. MIPs are passive points, responding only when triggered by CFM trace route and loopback messages. In the example of FIG. 1, there are MIPs 1, 2 in the customer OAM MD 40 which are the PE routers 16, 18, MIPs 3, 4, 5, 6 in the provider OAM MD 40 which are the routers 20, 24, 26, 30, MIP 7 in the operator 1 OAM MD 40 which is the router 22, and MIP 8 in the operator 2 OAM MD 40 which is the router 28, For fault isolation, CFM uses three techniques that work together to help administrators debug Ethernet networks. They are continuity check messages (CCMs), linktrace (LT) messages, and loopback (LB) messages. CCMs are heartbeat messages that provide a mechanism to detect connectivity failures in an MA. CCMs are multicast messages. CCMs are confined to a domain (MD). These messages are unidirectional and do not solicit a response. Each MEP transmits a periodic multicast CCM message inward towards the other MEPs.

Linktrace messages otherwise known as media access control (MAC) trace route are multicast frames that a MEP transmits to track the path (hop-by-hop) to a destination MEP which is similar in concept to user datagram protocol (UDP) trace route. Each receiving MEP sends a trace route reply directly to the originating MEP, and regenerates the Trace Route Message.

Loopback messages otherwise known as MAC ping are unicast frames that a MEP transmits, they are similar in concept to an Internet control message protocol (ICMP) Echo (Ping) messages, sending loopback to successive MIPs can determine the location of a fault. Sending a high volume of loopback messages can test bandwidth, reliability, or jitter of a service, which is similar to flood ping. A MEP can send a loopback to any MEP or MIP in the service. Unlike CCMs, loopback messages are administratively initiated and stopped.

Fault Isolation

In CFM, fault isolation is performed by sending out user triggered loopback or linktrace messages and then observing the received responses from the MEPs and MIPs. This process requires manual intervention and hence, there is an opportunity to improve this process by modifying the behavior of the CFM entities (namely the MIPs). A CFM MEP is the endpoint of a CFM service, and it is an 'active' entity. It transmits and receives the heartbeat message, namely the CCM messages. These messages are used to detect several different service faults in a network.

On the other hand, a CFM MIP is a passive entity, and it is created between CFM endpoints. It only responds to specific messages (loopback/linktrace) when they are triggered by a user. MIPs also maintain a database of the MEPs by snooping the heartbeat CCM messages. MIPs are useful for fault isolation as their responses indicate the working of a path.

Enhanced MIP Functionality

The present disclosure includes an improvement to the fault isolation process of CFM using enhanced MIP functionality. In particular, the MIPs 1-8 can be configured to send out unsolicited response messages if they detect a loss of CCM messages from a CFM endpoint. This enhanced CFM MIP functionality can respond proactively in case of loss of CCMs, thus, automating fault isolation process. There can be a Boolean FLAG introduced in the loopback, linktrace response protocol data units (PDUs) to identify an unsolicited message from a user triggered response message. There can be an added MEP Identifier in the unsolicited response message PDU to provide information of the lost CCMs (and the MEP to which they belonged). The MEPs can include a database to uniquely identify and register the unsolicited response message received from a MIP. The MIPs can have their CCM database updated to add MEP ID information in it from the snooped CCMs.

Again, with the conventional approach, in case of a CFM failure which leads to loss of CCMs, a user needs to trigger specific messages to perform fault isolation in the network. This fault isolation process requires user input as it is a manual process. The approach described herein can use modifications in the MIPs to automate/enhance the fault isolation process, dramatically increasing efficiency, removing manual effort, etc.

The enhanced MIP functionality can be thought of as "proactive" MIPs which are enhanced to respond proactively in case of the loss of CCM messages. A MIP can be programmed to detect the loss of CCMs from the MEPs by reading the remote defect indicator (RDI) bit in CCMs and loss of CCMs in a particular direction from a MEP. During a MIP's configuration, a user can decide if unsolicited responses are to be enabled for either loopback, linktrace, or both. A MIP can then send out 'unsolicited' loopback/linktrace response messages to the MEP from which it would still be receiving the CCM messages. The MIP can use a special flag bit to denote the unsolicited nature of the response message that it sends to the MEP. This unsolicited response message can include the MAC Address/MEP Identifier of the CCMs that are now not received at the MIP. The MEP can register this response message from the MIP, such as in a separate database. A user/network management system can refer to the information present in this database at the MEP, to obtain the fault location in the network 10.

Proactive MIP Process

FIG. 2 is a flowchart of a proactive MIP process 50. The proactive MIP process 50 contemplates implementation as a method having steps, via one of the MIPs 1-8 configured to implement the steps, via circuitry configured to implement the steps, and as a non-transitory computer-readable medium storing instructions that, when executed, cause one or more processors to implement the steps.

The MIP detects a service fault by reading the RDI bit set in the CCM messages (from one direction) along with the loss of reception of CCM messages from a MEP in the other direction (step 51). The MIP will run a timer (which can be defined at the time of MIP configuration (step 52), and the MIP will verify that the service fault exists even after the expiry of the time (step 53). This timer will allow enough time allowance to the MEPs to generate the relevant CFM fault notifications. Upon the expiry of the timer, The MIP will use its MEP CCM database to send out an 'unsolicited' response message (step 54), such a message will have a flag bit set in the PDU to highlight the unsolicited nature of the message. The PDU will also contain the MEP identifier of the CCMs that are not received at the MIP (step 55).

This message will be sent to the MEP which would be accessible to the MIP (the one from which the MIP would still be receiving the CCM messages even after service fault) (step 56). The MEP can register the unsolicited response such as in a separate database (step 57). The user/network controller can read the data from the MEP database to get information of the service fault location, thereby isolating the fault (step 58).

Example Operation

Referring back to FIG. 1, the MEPs A-H and MIPs 1-8 are as described above and shown in the network 10. To illustrate the process 50, assume there is a fault, fiber cut, etc. between the routers 24, 26 and the operator 1 and operator 2 network 32, 34.

The following events would take place:

(1) The MIPs 1, 2 would detect a loss of CCMs, namely the MIP 1 will see a loss of CCMs from the MEP B, and the MIP 2 will see a loss of CCMs from the MEP A, due to the fault.

(2) The MIPs 3, 4, 5 and 6 would also detect a loss of CCMs due to fiber cut, namely the MIPs 3,4 will see a loss of CCMs from the MEP B, and the MIPs 5, 6 will see a loss of CCMs from the MEP A, due to the fault.

(3) The CFM services for the MD 40 for the operator 1 and operator 2 (MEPs E, F and G, H) will not be impacted due to the fault.

(4) The unsolicited message sent by the MIPs would be as per the following table

| MIP Name | Message Sent TO: | PDU Field: 'Unsolicited Message' | PDU Field: 'Lost Connection to': |
|---|---|---|---|
| 1 | MEP A | TRUE | MEP B ID |
| 2 | MEP B | TRUE | MEP A ID |
| 3 | MEP C | TRUE | MEP D ID |
| 4 | MEP C | TRUE | MEP D ID |
| 5 | MEP D | TRUE | MEP C ID |
| 6 | MEP D | TRUE | MEP C ID |

(5) The response message will have the BIT true (set) for denoting unsolicited message and it will also contain the MEP's Identifier (MEPID) to inform about the connection that is lost.

These response messages can be coordinated as follows:

(1) On the PE router 16 with the MEP C—one response each is received from the two MIPs 3, 4 which indicates that a fault is present beyond MIP 4.

(2) On the PE router 18 with the MEP D—one response each is received from the two MIPs 5, 6 which indicates that a fault is located beyond MIP 5.

Using this information together, it can be ascertained that the fault is located between MIP 4 and MIP 5.

Note, this coordination can be at a management system, network controller, software defined networking (SDN) controller, a network element, or any processing device or service used to monitor the network 10. In one embodiment, the routers 16-30 can provide all of the unsolicited information. In another embodiment, the routers 16-30 can provide their answer, e.g., the MEP C can report that the fault is present beyond MIP 4, and the MEP D can report that the fault is located beyond MIP 5. The key is a user does not need to manually trigger these messages. Some processing device or service can automatically correlate the unsolicited messages to automatically determine the fault location, i.e., where the unsolicited responses stop, in the example of FIG. 1, between the routers 24, 26, the MIPs 4, 5.

Processes

The present disclosure contemplates operation at various different locations in the network 10, namely the MIPs, the MEPs, and at a management system. FIG. 3 is a flowchart of a MIP process 70, FIG. 4 is a flowchart of a MEP process 80, and FIG. 5 is a flowchart of a management system process 90. The processes 70, 80, 90 contemplates implementation as a method having steps, via circuitry configured to implement the steps, and as a non-transitory computer-readable medium storing instructions that, when executed, cause one or more processors to implement the steps. Also, while described separately, the processes 70, 80, 90 contemplate implementation together in a CFM network to automatically isolate the fault.

In FIG. 3, the MIP process 70 includes monitoring continuity check messages (CCMs) from a first maintenance association end point (MEP) and a second MEP (step 71), and, responsive to detection of a loss of CCMs, from the first MEP, sending one or more unsolicited response messages to the second MEP (step 72). The one or more unsolicited response messages are usable by the second MEP to isolate a location of a fault causing the loss of CCMs. The one or more unsolicited response messages can be one of a loopback response message, a linktrace response message, and a combination thereof. The one or more unsolicited response messages can include a designation to indicate that it is unsolicited. The one or more unsolicited response messages can include an identifier of the first MEP from which there is the loss of CCMs. The detection of the loss of CCMs can include reception of a CCM from the second MEP with a remote defect indication, loss of the CCMs from the first MEP, and expiration of some predetermined time with the reception and the loss continuing. The MIP process 70 can further include storing the monitored CCMs in a database with an added identifier of an associated MEP for the monitored CCMs (step 73). A MIP can delay the sending of unsolicited messages to the second MEP by a configurable timer value (step 53). This will ensure that the MEPs have sufficient time to generate the notification for the CFM service fault and then after that is completed, the fault isolation can be initiated by the MIP.

In FIG. 4, the MEP process 80 includes sending continuity check messages (CCMs) to a second MEP with one or more maintenance domain intermediate point (MIP) between the MEP and the second MEP (step 81), responsive to detection of a loss of CCMs from the second MEP, sending a CCM with a remote defect indicator (RDI) towards the second MEP (step 82), and receiving one or more unsolicited response messages from the one or more MIPs (step 83). The MEP process 80 can further include analyzing the one or more unsolicited response messages to isolate a location of a fault causing the loss of CCMs (step 84). The location can be at least after the last MIP, of the one or more MIPs that provides the one or more unsolicited response messages.

The one or more unsolicited response messages can be one of a loopback response message, a linktrace response message, and a combination thereof. The one or more unsolicited response messages can include a designation to indicate that it is unsolicited. The one or more unsolicited response messages can include an identifier of the first MEP from which there is the loss of CCMs. The MEP process 80 can include adding the one or more unsolicited response messages in a database.

In FIG. 5, the management system process 90 includes, responsive to operation of a connectivity fault management (CFM) session between a first maintenance association end point (MEP) and a second MEP with one or more maintenance domain intermediate points (MIPs) between the first MEP and the second MEP, and responsive to a fault, receiving first information from the first MEP and second information from the second MEP based on one or more unsolicited response messages from the one or more MIPs (step 91); and analyzing the first information and the second information to automatically determine a location of the fault. The one or more unsolicited response messages can be one of a loopback response message, a linktrace response message, and a combination thereof, sent by the one or more MIPs in response to detection of the fault.

The one or more MIPs can detect the fault based on reception of a CCM with a remote defect indication, loss of the CCMs, and expiration of some predetermined time with the reception and the loss continuing. The information can include a last MIP of the one or more MIPs that responded to each of the first MEP and the second MEP. The fault can be located between the last MIP that responded to the first MEP and the last MIP that responded to the second MIP. The management system process 90 can further include, responsive to the location being automatically determined, one or more of providing a notification of the location and presenting a visualization of the location.

Note, while the process 90 is described between two MEPs, those skilled in the art will appreciate the process 90 can be implemented in a multipoint CFM service, i.e., when there are more than two MEPs. Also, the process 90 can be implemented by Layer 2 Ethernet switches or any network device or network element that supports CFM. Further, in some embodiments, the MIP can delay the sending of unsolicited messages by a configurable timer value to provide time to the MEPs to generate a CFM fault notification. The MIP can also send a configurable number of such unsolicited messages with a configurable time interval between each such message.

Example Node

Figure 6:
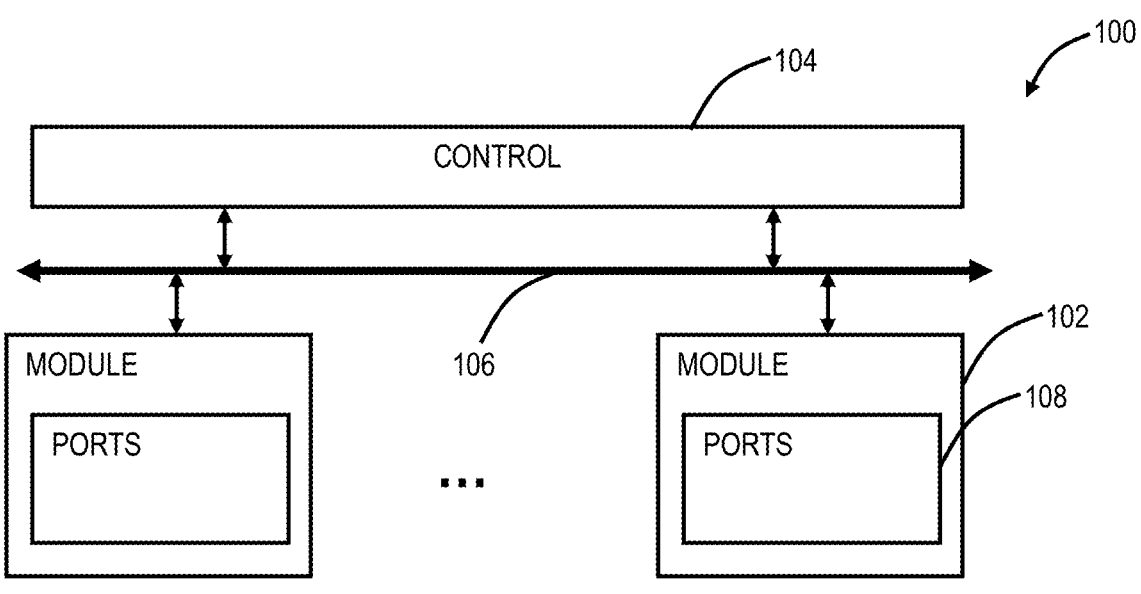
FIG. 6 is a block diagram of an example implementation of a router, such as forming any of the routers described herein.

FIG. 6 is a block diagram of an example implementation of a router 100, such as forming any of the routers described herein. Those of ordinary skill in the art will recognize FIG. 6 is a functional diagram in an oversimplified manner, and a practical embodiment may include additional components and suitably configured processing logic to support known or conventional operating features that are not described in detail herein.

In an embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 6 is meant to provide a functional view, and those of ordinary skill in the art will recognize actual hardware implementations may vary; all of which are contemplated herewith.

Example Processing Device

Figure 7:
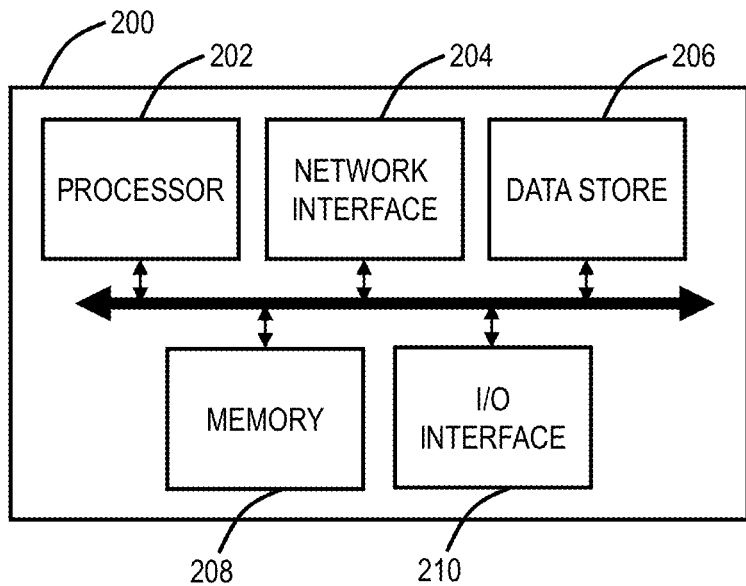
FIG. 7 is a block diagram of an example processing device.

FIG. 7 is a block diagram of an example processing device 200. The processing device 200 can be part of the router 100, or a stand-alone device communicatively coupled to the router 100, such as a management system, controller, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A maintenance domain intermediate point (MIP) in a network supporting connectivity fault management (CFM), the MIP comprising circuitry configured to:
   monitor continuity check messages (CCMs) received at the MIP from a first maintenance association end point (MEP) and from a second MEP, the first MEP and the second MEP participating in a CFM session, and
   responsive to detecting a fault condition comprising (i) reception, at the MIP, of CCMs from the second MEP with a remote defect indication set, (ii) loss, at the MIP, of CCMs from the first MEP, and (iii) expiration of a predetermined time with the reception and the loss continuing, send one or more unsolicited response messages from the MIP toward the second MEP.

2. The MIP of claim 1, wherein the one or more unsolicited response messages are usable by the second MEP to isolate a location of a fault causing the loss of CCMs based at least on the MIP sending the one or more unsolicited response messages in combination with one or more additional MIPs sending further respective unsolicited response messages.

3. The MIP of claim 1, wherein the one or more unsolicited response messages are one of a loopback response message, a linktrace response message, and a combination thereof.

4. The MIP of claim 1, wherein each of the one or more unsolicited response messages includes a designation related to whether he unsolicited response message is unsolicited rather than a user-triggered response message.

5. The MIP of claim 1, wherein the one or more unsolicited response messages include an identifier of the first MEP from which there is the loss of CCMs.

6. The MIP of claim 1, wherein the predetermined time is a configurable timer value selected to provide sufficient time for the first and second MEPs to generate CFM fault notifications before the one or more unsolicited response messages are sent, and wherein the circuitry is further configured to send a configurable number of the one or more unsolicited response messages with a configurable time interval between successive unsolicited response messages.

7. The MIP of claim 1, wherein the circuitry is further configured to store the monitored CCMs in a database with an added identifier of an associated MEP for the monitored CCMs.

8. A maintenance association end point (MEP) in a network supporting connectivity fault management (CFM), the MEP comprising circuitry configured to:
   send continuity check messages (CCMs) to a second MEP with one or more maintenance domain intermediate point (MIP) between the MEP and the second MEP,
   responsive to detection of a loss of CCMs from the second MEP, send a CCM with a remote defect indicator (RDI) towards the second MEP, and
   receive one or more unsolicited response messages from the one or more MIPs, the one or more unsolicited response messages comprising at least one of a loopback response message and a linktrace response message, each unsolicited response message including (i) a designation indicating that the message is unsolicited and (ii) an identifier of a MEP from which CCMs are not received at a corresponding MIP.

9. The MEP of claim 8, wherein the circuitry is further configured to
   analyze the one or more unsolicited response messages, including identifiers of the MIPs that sent the unsolicited response messages, to isolate a location of a fault causing the loss of CCMs.

10. The MEP of claim 8, wherein the location is at least after a last MIP of the one or more MIPs that provides the one or more unsolicited response messages to the MEP.

11. The MEP of claim 8, wherein the circuitry is further configured to send user-triggered loopback and linktrace request messages and to distinguish responses to the user-triggered messages from the one or more unsolicited response messages based on the designation indicating that the unsolicited response messages are unsolicited.

12. The MEP of claim 8, wherein the one or more unsolicited response messages include a designation related to whether a given unsolicited message is unsolicited rather than a user-triggered response message.

13. The MEP of claim 8, wherein for unsolicited response messages received at the MEP from a given MIP, an identifier included in the unsolicited response messages identifies the second MEP from which there is the loss of CCMs at the given MIP.

14. The MEP of claim 8, wherein the circuitry is further configured to
   add the one or more unsolicited response messages in a database.

15. A non-transitory computer-readable medium comprising instructions that, when executed, cause one or more processors to perform steps of:
   responsive to operation of a connectivity fault management (CFM) session between a first maintenance association end point (MEP) and a second MEP with one or more maintenance domain intermediate points (MIPs) between the first MEP and the second MEP, and responsive to a fault, receiving first information from the first MEP and second information from the second MEP based on one or more unsolicited response messages from the one or more MIPs; and analyzing the first information and the second information to automatically determine a location of the fault in the CFM session based at least on which of the one or more MIPs have sent the one or more unsolicited response messages to the first MEP and to the second MEP, wherein the one or more MIPs detect the fault based on reception, at a MIP, of a CCM with a remote defect indication from one of the first MEP and the second MEP, loss, at the MIP of the CCMs from the other of the first MEP and the second MEP, and expiration of a predetermined time with the reception and the loss continuing.

16. The non-transitory computer-readable medium of claim 15, wherein the one or more unsolicited response messages are one of a loopback response message, a linktrace response message, and a combination thereof, sent by the one or more MIPs in response to detection of the fault.

17. The non-transitory computer-readable medium of claim 15, wherein the first information and the second information includes a last MIP of the one or more MIPs that responded to each of the first MEP and the second MEP.

18. The non-transitory computer-readable medium of claim 15, wherein the fault is located between the last MIP that responded to the first MEP and the last MIP that responded to the second MIP.

19. The non-transitory computer-readable medium of claim 15, wherein the steps further include
    responsive to the location being automatically determined, one or more of providing a notification of the location and presenting a visualization of the location.

* * * * *